United States Patent
Peters, Jr. et al.

(10) Patent No.: US 10,683,655 B2
(45) Date of Patent: Jun. 16, 2020

(54) EXPANSION RING MOUNTABLE IN A STORM DRAIN FOR SUPPORTING A FILTERING APPARATUS

(71) Applicant: Fabco Industries Inc., Farmingdale, NY (US)

(72) Inventors: John Peters, Jr., Coram, NY (US); Mario Szczepanski, Centereach, NY (US)

(73) Assignee: Fabco Industries Inc., Farmingdale, NY (US)

( * ) Notice: Subject to any disclaimer, the term of this patent is extended or adjusted under 35 U.S.C. 154(b) by 6 days.

(21) Appl. No.: 16/229,755

(22) Filed: Dec. 21, 2018

(65) Prior Publication Data
US 2019/0203457 A1 Jul. 4, 2019

Related U.S. Application Data

(60) Provisional application No. 62/613,229, filed on Jan. 3, 2018.

(51) Int. Cl.
| | |
|---|---|
| *E03F 5/04* | (2006.01) |
| *E03F 5/10* | (2006.01) |
| *B01D 35/30* | (2006.01) |
| *B01D 29/13* | (2006.01) |
| *B01D 29/23* | (2006.01) |
| *C02F 1/00* | (2006.01) |
| *C02F 103/00* | (2006.01) |

(52) U.S. Cl.
CPC ............. *E03F 5/106* (2013.01); *B01D 29/13* (2013.01); *B01D 29/23* (2013.01); *B01D 35/306* (2013.01); *E03F 5/041* (2013.01); *E03F 5/0404* (2013.01); *B01D 2201/02* (2013.01); *C02F 1/004* (2013.01); *C02F 2103/001* (2013.01); *C02F 2201/004* (2013.01)

(58) Field of Classification Search
CPC ........ E03F 5/0404; E03F 5/041; B01D 23/28; B01D 29/23; B01D 35/306
USPC ........ 210/163, 164, 478, 479, 480; 404/2, 4, 404/5; 248/94
See application file for complete search history.

(56) References Cited

U.S. PATENT DOCUMENTS

| | | | |
|---|---|---|---|
| 6,086,758 A * | 7/2000 | Schilling | E03F 5/0404 210/164 |
| 6,254,770 B1 * | 7/2001 | Remon | E03F 5/0404 210/163 |

(Continued)

*Primary Examiner* — Christopher Upton
(74) *Attorney, Agent, or Firm* — Bodner & O'Rourke, LLP; Gerald T. Bodner; Christian P. Bodner

(57) ABSTRACT

An expansion ring mountable in a storm drain for supporting a filtering apparatus includes a ring-shaped expansion member having an adjustable diameter which is cut transversely to define two open end portions thereon which face each other and which are separated from each other by a predetermined distance to define a gap therebetween. A wedge assembly is positioned at the gap between the open end portions of the expansion member and is adjustable to increase the diameter of the expansion member. When the wedge assembly is adjusted to increase the diameter of the expansion member, the expansion member tightly engages a side wall of a portion of the storm drain in which the expansion ring is mounted to secure the expansion ring, and a filtering apparatus supported thereby, in a desired position.

20 Claims, 16 Drawing Sheets

(56) References Cited

U.S. PATENT DOCUMENTS

| | | | | |
|---|---|---|---|---|
| 6,537,447 B2* | 3/2003 | Remon | ............... | E03F 5/0404 |
| | | | | 210/163 |
| 7,201,843 B2* | 4/2007 | Sasaki | ................. | E03F 5/0404 |
| | | | | 210/164 |
| 7,670,483 B2* | 3/2010 | Ringenbach | ......... | E03F 5/0404 |
| | | | | 210/163 |
| 10,174,495 B2 | 1/2019 | Peters | | |
| 2004/0188357 A1* | 9/2004 | Moore | .................... | E03F 5/14 |
| | | | | 210/163 |
| 2014/0064840 A1* | 3/2014 | McInnis | ............... | E03F 5/0404 |
| | | | | 403/374.3 |

* cited by examiner

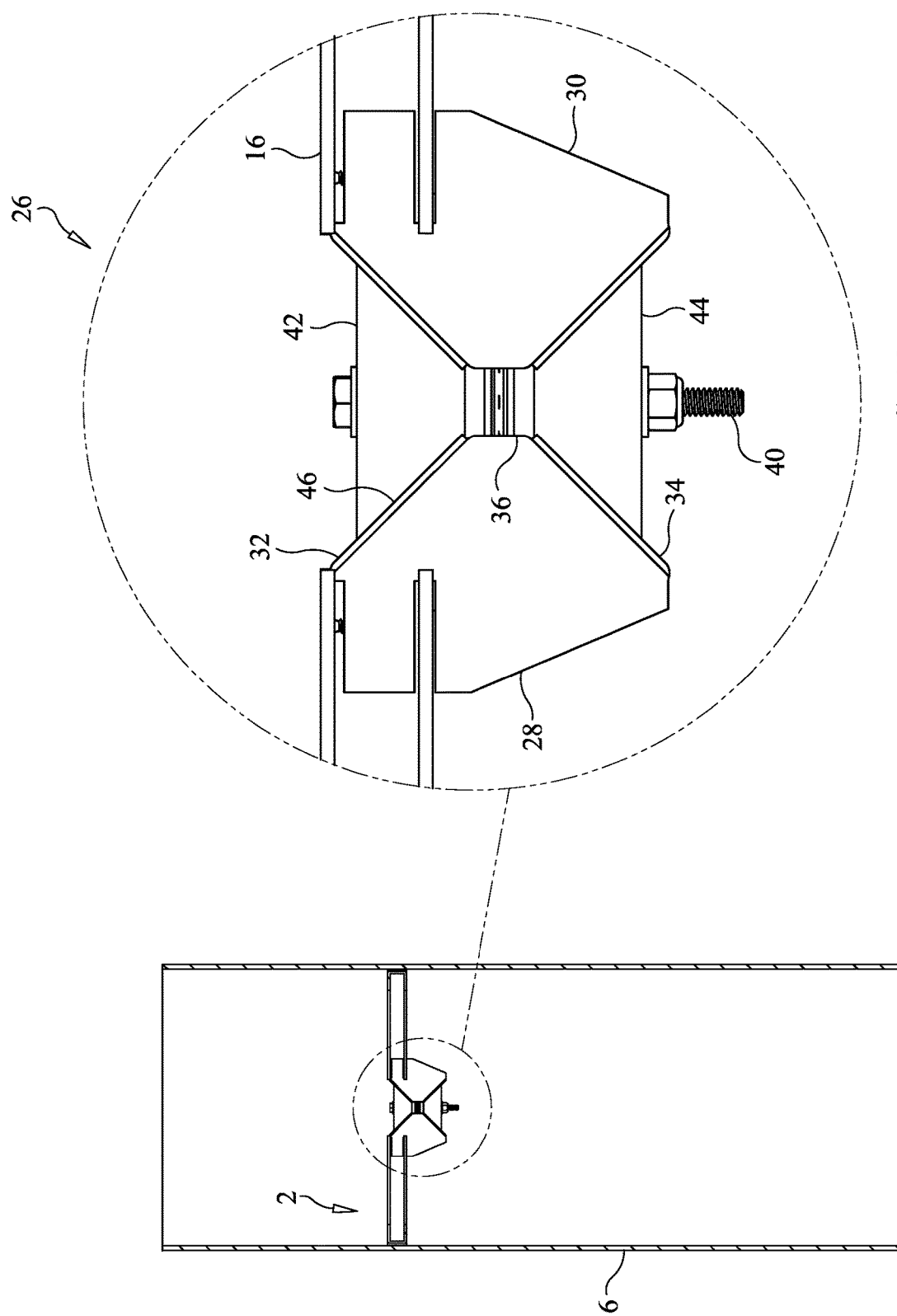

EXPANSION RING MOUNTABLE IN A STORM DRAIN FOR SUPPORTING A FILTERING APPARATUS

CROSS-REFERENCE TO RELATED APPLICATIONS

This application is related to U.S. Provisional Patent Application Ser. No. 62/613,229, filed on Jan. 3, 2018, and entitled "Expansion Ring Mountable in a Storm Drain for Supporting a Filtering Apparatus", the disclosure of which is hereby incorporated by reference and on which priority is hereby claimed.

BACKGROUND OF THE INVENTION

Field of the Invention

The present invention generally relates to runoff water drainage systems, and more particularly relates to filtering apparatus for filtering debris and other contaminants from runoff water. Even more specifically, the present invention relates to mounting means for holding such debris filtering apparatus in place within the runoff water drainage system.

Description of the Prior Art

There exist many forms of filtering apparatus that are mountable in runoff water drainage systems to filter out debris and contaminants from runoff water. Such filtering apparatus include, by way of example, a sock or net formed of a water-permeable filtering medium having a closed end and an opposite open end into which runoff water flows. The water flowing into the sock is filtered so that it is substantially free of debris and/or contaminants after it passes through the filtering medium and into a discharge pipe of the drainage system. The open end of the debris filtering sock is held open by a circular flange which is usually mounted at the top end of a water ingress conduit beneath a storm water drainage grating or manhole cover.

Another form of a filtering apparatus, which not only filters out debris from runoff water but also can close egress to a discharge pipe if hydrocarbons in the runoff water are detected, is disclosed in U.S. Patent Application Ser. No. 62/539,818, filed on Aug. 1, 2017, and published under Publication No. 2017/0321412, the disclosure of which is incorporated herein by reference. This form of filtering apparatus may be supported within a runoff water ingress conduit of a storm water drainage system by a flange that rests on a ledge or lip of the conduit beneath a grate which is, by way of example, formed flush in a paved road or parking lot.

The mounting flange forming part of the filtering apparatus to hold open or mount the debris filtering sock or hydrocarbon shut off filtering apparatus may, in some instances, cause the storm water grate or manhole cover to be raised slightly above the level of the ground or paved surface in which it is mounted due to the thickness of the mounting flange. Although such raised grate or manhole cover does not cause a problem in most instances, it may be considered unacceptable in certain circumstances, such as on runways at airports or on highways.

More specifically, many storm water runoff filtering apparatus in the industry rests directly on the same ledge that supports the grate or cover. This tends to raise the grate or cover, potentially causing a risk for snow plows or certain vehicles. For example, many of the airports in the United States do not permit storm drain covers or grates to be raised.

OBJECTS AND SUMMARY OF THE INVENTION

It is an object of the present invention to provide a mounting mechanism which is used to support a debris or contaminant filtering apparatus within a conduit of a runoff water drainage system.

It is another object of the present invention to provide a mounting mechanism that supports a debris or contaminant filtering apparatus at various desirable heights or locations, either vertically or horizontally, within a conduit of a runoff water drainage system.

It is still another object of the present invention to provide a mounting mechanism for supporting a debris or contaminant filtering apparatus within a conduit of a runoff water drainage system which does not cause a grating or cover of the drainage system to be raised in order to mount the filtering apparatus within the conduit.

It is a further object of the present invention to provide a mounting mechanism for supporting a debris or contaminant filtering apparatus within a conduit of a runoff water drainage system, which mounting mechanism is radially expandable to fit tightly against and engage the interior surface of the drainage system conduit at a desired location therein.

It is yet a further object of the present invention to provide an expansion ring mountable in a conduit of a runoff water drainage system for supporting a debris or contaminant filtering apparatus at a desired location within the conduit, which expansion ring may be easily accessed and tightened from above the ring to secure the ring within the bore of the conduit without the need to apply a precise torque to the ring to hold the ring in place within the conduit.

It is still a further object of the present invention to provide an expansion ring mountable in a conduit of a runoff water drainage system for supporting a debris or contaminant filtering apparatus therein, which expansion ring includes an indicator for the installer of the filtering apparatus to use to determine whether the ring has been sufficiently expanded to securely engage the interior surface of the conduit in which it is mounted to support the filtering apparatus therein without slippage.

It is still another object of the present invention to provide a mounting mechanism that supports a debris or contaminant filtering apparatus within a conduit of a runoff water drainage system which overcomes the inherent disadvantages of known mounting mechanisms.

In one form of the present invention, a mounting mechanism for supporting a debris or contaminant filtering apparatus, such as a filter sock, within a conduit of a runoff water drainage system, includes an expandable ring having a cylindrical main portion and an expansion wedge assembly which, when tightened, expands the diameter of the cylindrical main portion of the ring so that the ring tightly engages the inside surface of the conduit in which the ring is mounted to secure the ring and the filtering apparatus mounted thereon at a desired location within the conduit. The cylindrical main portion of the expansion ring may be in the form of an aluminum or metal extrusion having a U-shape in transverse cross-section, or a molded plastic cylindrical piece. The cylindrical main portion is cut transversely to form open ring end portions that face each other and which define a space therebetween. In between this space is received the wedge assembly.

The wedge assembly of the expansion ring, when tightened or loosened, sets the diameter of the main cylindrical portion and the overall expansion and contraction of the ring. The wedge assembly includes two circumferentially opposite expansion blocks. These expansion blocks may be secured to the open ring end portions, in the case of the expandable metal extrusion member, or may be formed integrally with, and constitute parts of, the open ring end portions, in the case of the molded plastic cylindrical expansion piece. Each expansion block has upper and lower, oppositely sloping surfaces. Thus, the expansion blocks define between them a gap at the sloping surfaces thereof.

A pair of sliding, oppositely disposed wedge blocks, each being in the general form of a truncated triangle having a shorter flat end wall situated at the apex thereof, is received within the gap defined by the expansion blocks and situated to engage and slide on the sloping surfaces thereof. The wedge blocks are joined together on a threaded machine screw or bolt.

When the bolt is turned in one direction, the wedge blocks advance on the bolt towards each other, sliding on the expansion blocks within the gap and forcing the facing ends of the expansion member apart to expand the expansion member in diameter. The expanded ring closely engages the interior surface of the conduit of the water drainage system in which it is mounted to secure a debris or contamination filter apparatus mounted thereon within the conduit at a desired location therein. Turning the bolt in the opposite direction will cause the wedge blocks to separate. This, in turn, will relieve pressure on the expansion blocks and will result in reducing the overall diameter of the expansion ring to allow the expansion ring to be inserted into and positioned in the water drainage conduit or removed therefrom.

The expansion support ring may be located within a vertical pipe or conduit sufficiently below a manhole casting or frame so as not to interfere with a manhole cover or storm grate. The expansion support ring may be located deep into a vertical pipe, just below an inlet invert port, to support a storm water filtering unit.

The expansion ring may also be used in a horizontal pipe or conduit to attach a debris screen. The internal walls of manhole vaults are often irregular and difficult to attach a filtering apparatus to, simply because there are no flat surfaces. Inside many of these vaults, the concrete walls have crumbled, have cracks or have been patched with concrete or brick. However, the outlet pipe inner diameter is almost always clean and round, providing a perfect location to attach the expansion support ring of the present invention. A storm water filtering apparatus may be anchored to the expansion ring.

The bolt of the wedge assembly may be tightened until the two mirror-image wedges meet. This provides the appropriate tension to support the filtering apparatus without the need to use a torque wrench which, oftentimes, is not carried by installation teams.

A non-slip, sandpaper-like gasket is preferably attached to the outer diameter of the expansion ring to provide a second layer of friction to assure that the expansion ring will not slip inside the pipe after being tightened.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 9 is a cross-sectional view of the expansion support ring of the present invention shown in FIG. 8 and received within a vertical pipe or conduit of a storm water drainage system, taken along line A-A of FIG. 8.

FIG. 10 is a detailed cross-sectional view of a portion of the expansion support ring of the present invention shown encircled by broken lines in FIG. 9 of the drawings.

DETAILED DESCRIPTION OF THE PREFERRED EMBODIMENTS

Figures 1, 1A:
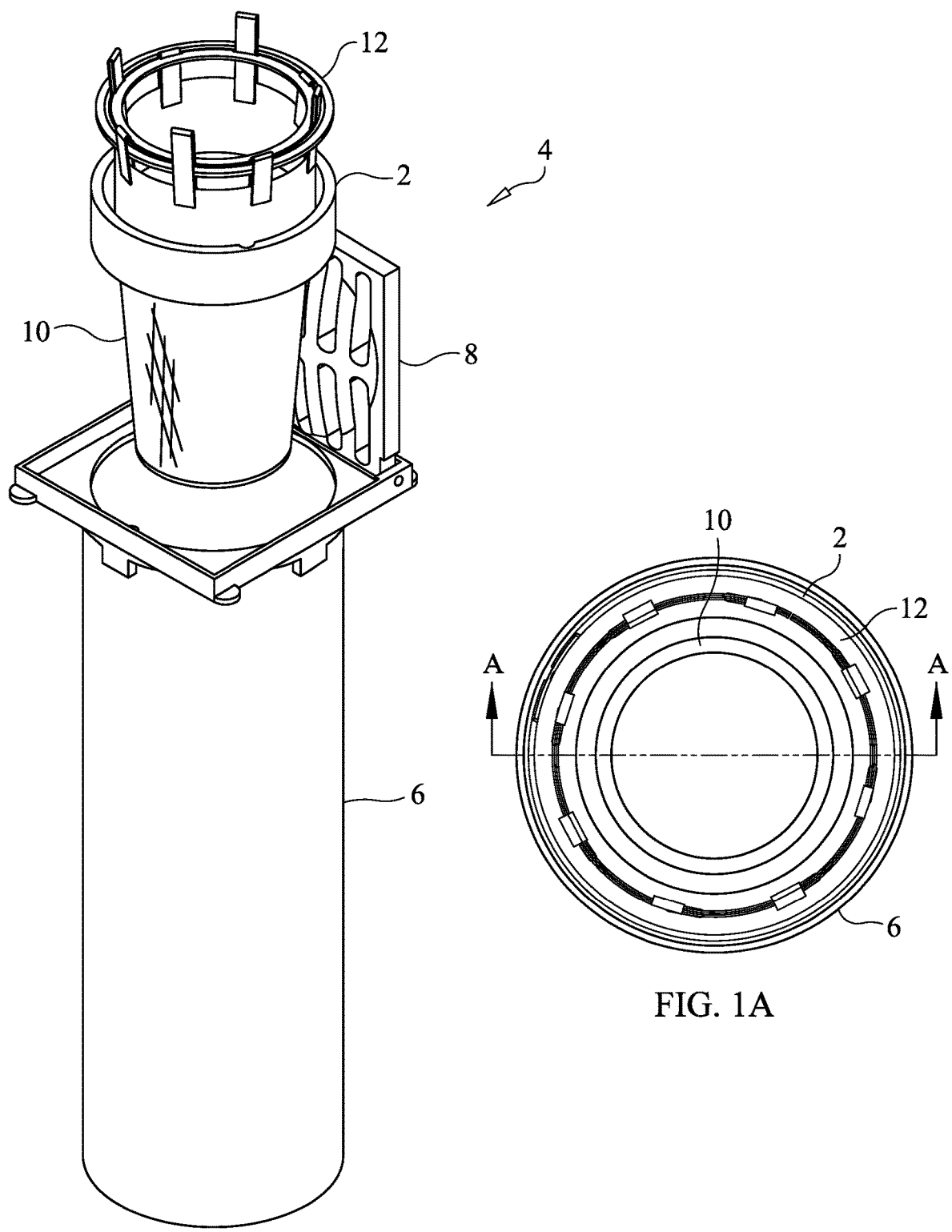
FIG. 1 is an exploded perspective view of an assembly which includes a filtering apparatus, an expansion support ring formed in accordance with the present invention, and a support flange forming part of the filtering apparatus, shown being receivable within a conduit of a storm water drainage system and below a hinged storm grate forming part of the drainage system.
FIG. 1A is a top plan view of the combination of a filtering apparatus, such as shown in FIG. 1 of the drawings, including its support flange, and one form of an expansion support ring constructed in accordance with the present invention, shown received within a conduit of a runoff water drainage system.
Figure 1B:
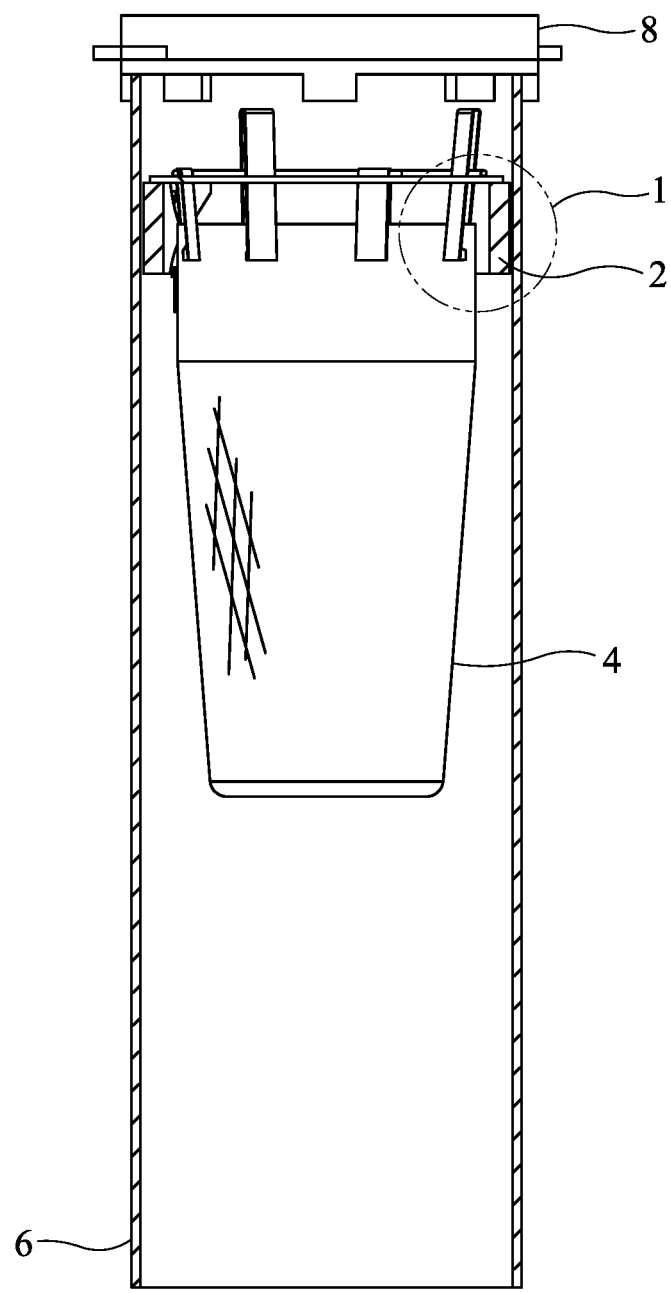
FIG. 1B is a cross-sectional view of the assembly of the filtering apparatus and the expansion support ring of the present invention shown in FIG. 1A, taken along line A-A of FIG. 1A.
Figure 2A:
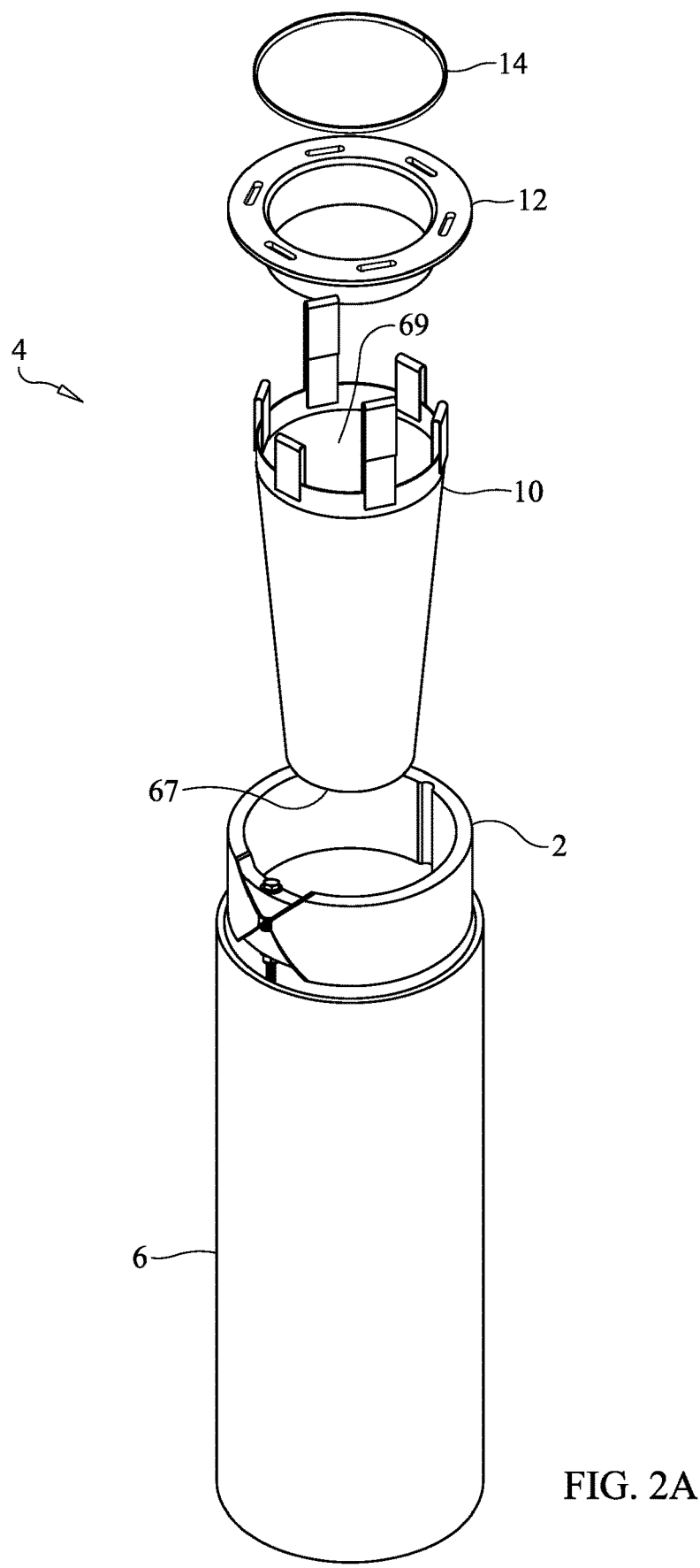
FIG. 2A is another exploded perspective view of an assembly formed from a sock-like filtering apparatus having a filtering medium, a mounting flange and a support ring, all forming part of the filtering apparatus, and one form of an expansion support ring of the present invention, shown as being receivable by a conduit of a runoff water drainage system.
Figure 2B:
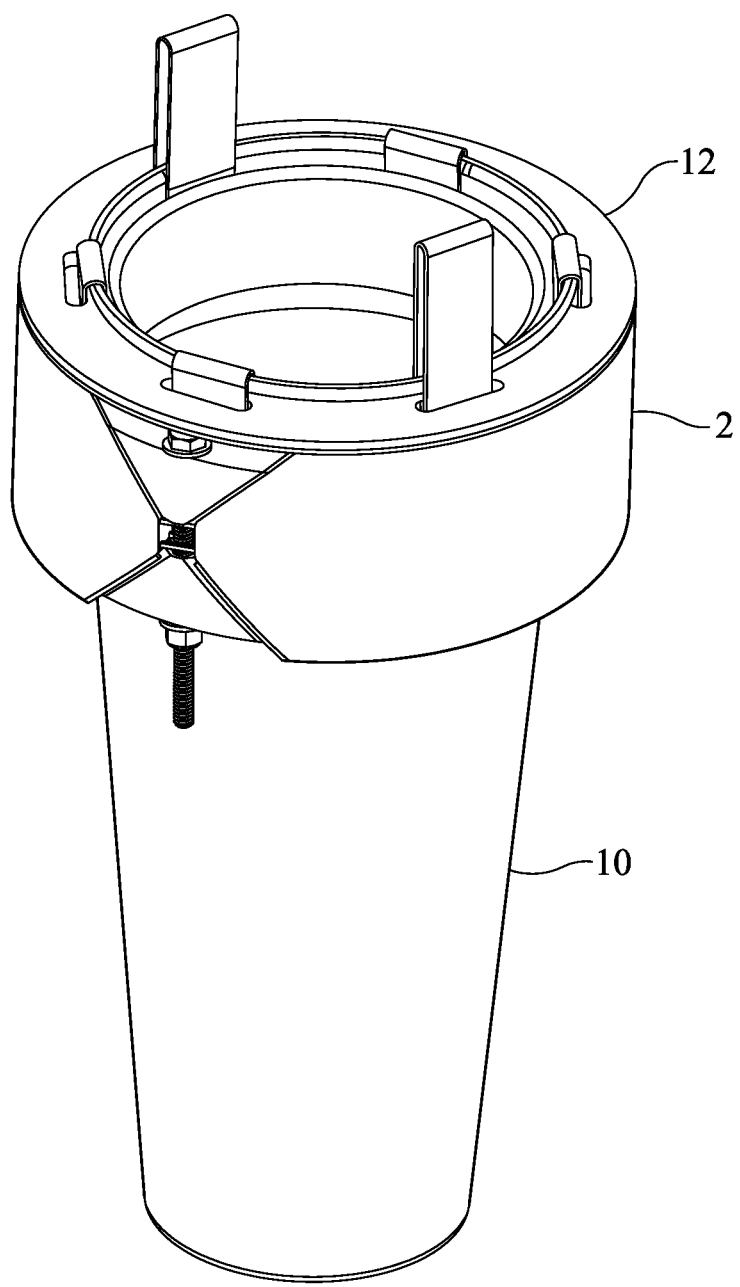
FIG. 2B is a perspective view of one form of the expansion support ring of the present invention shown in FIG. 1A supporting a filtering apparatus that includes a filtering medium, a mounting flange and a support ring, such as shown in FIG. 2A of the drawings.
Figure 3A:
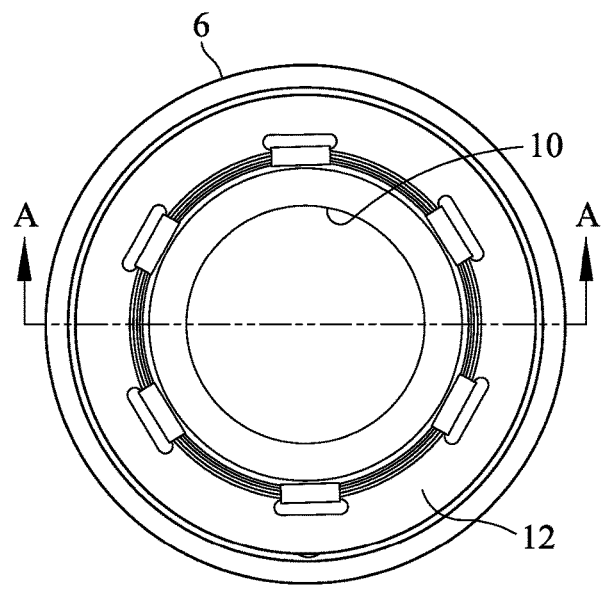
FIG. 3A is another top plan view of an assembly, such as shown in FIG. 2A, of a filtering apparatus, including a sock-like medium, a mounting flange and a support ring, and one form of an expansion support ring formed in accordance with the present invention, residing within a conduit of a runoff water drainage system.
Figure 3B:
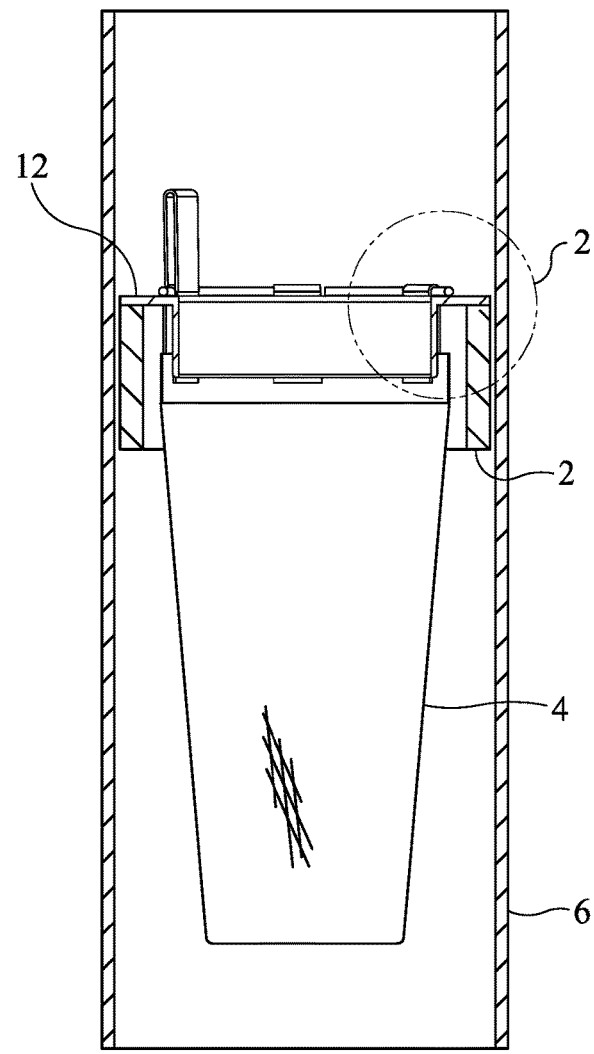
FIG. 3B is a cross-sectional view of the assembly of the filtering apparatus and expansion support ring of the present invention residing within the conduit of a runoff water drainage system that is shown in FIG. 3A, taken along line A-A of FIG. 3A.
Figure 4A:
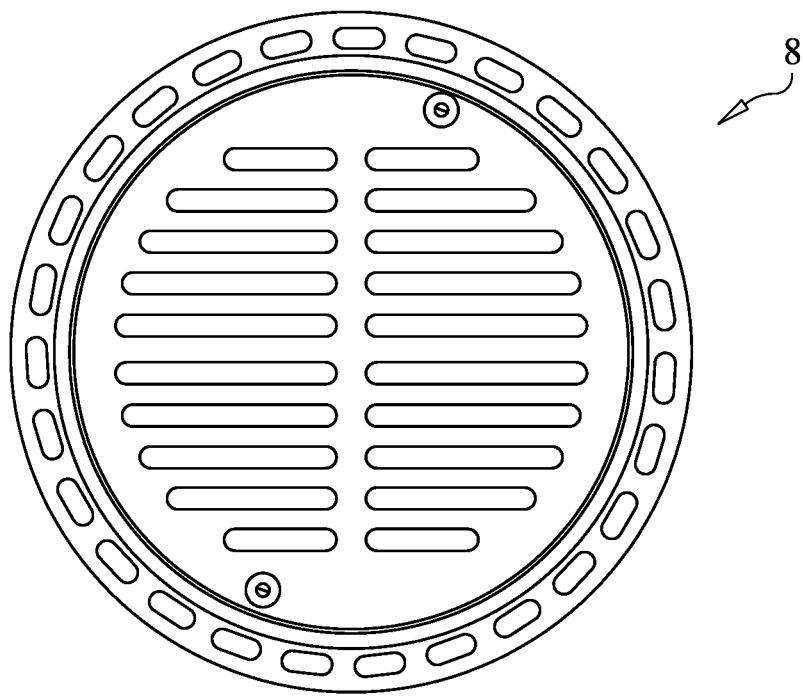
FIGS. 4A-4D are various grates of a storm water drainage system with which an assembly of a filtering apparatus and an expansion support ring formed in accordance with the present invention may be used, including a round or circular grate shown in FIG. 4A, a dome grate as shown in FIG. 4B, a square grate as shown in FIG. 4C and a rectangular, curb inlet grate as shown in FIG. 4D.
Figure 4B:
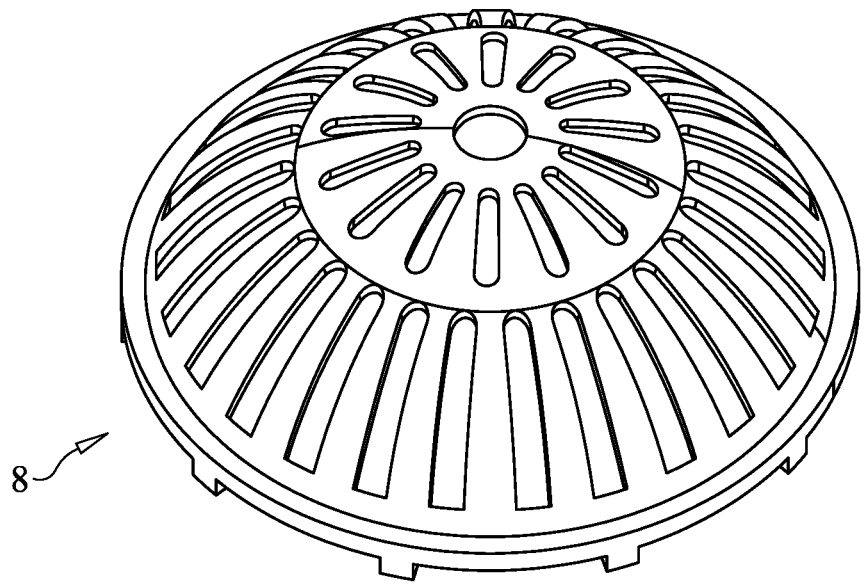
Figure 4C:
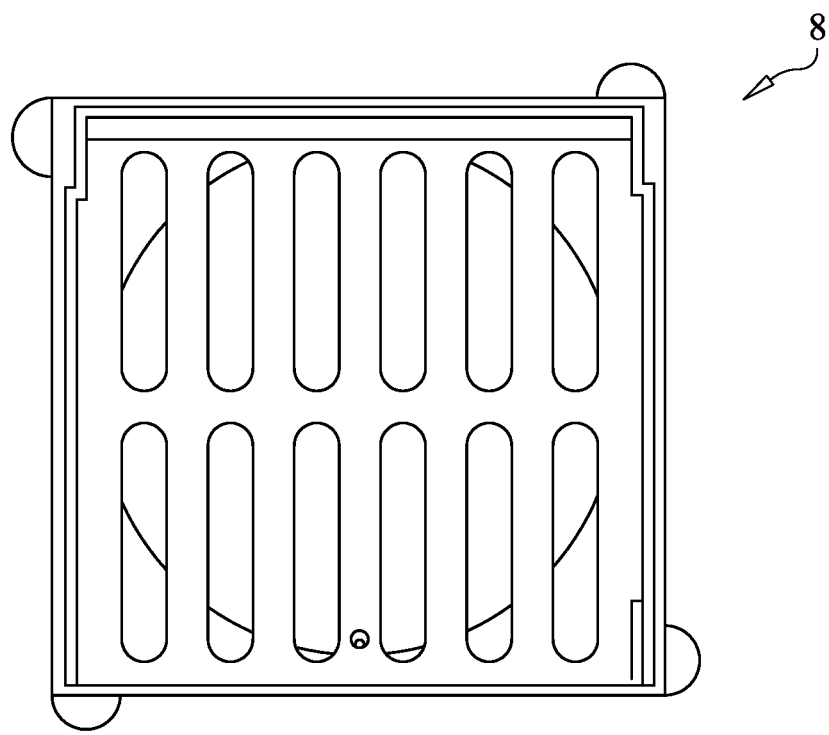
Figure 4D:
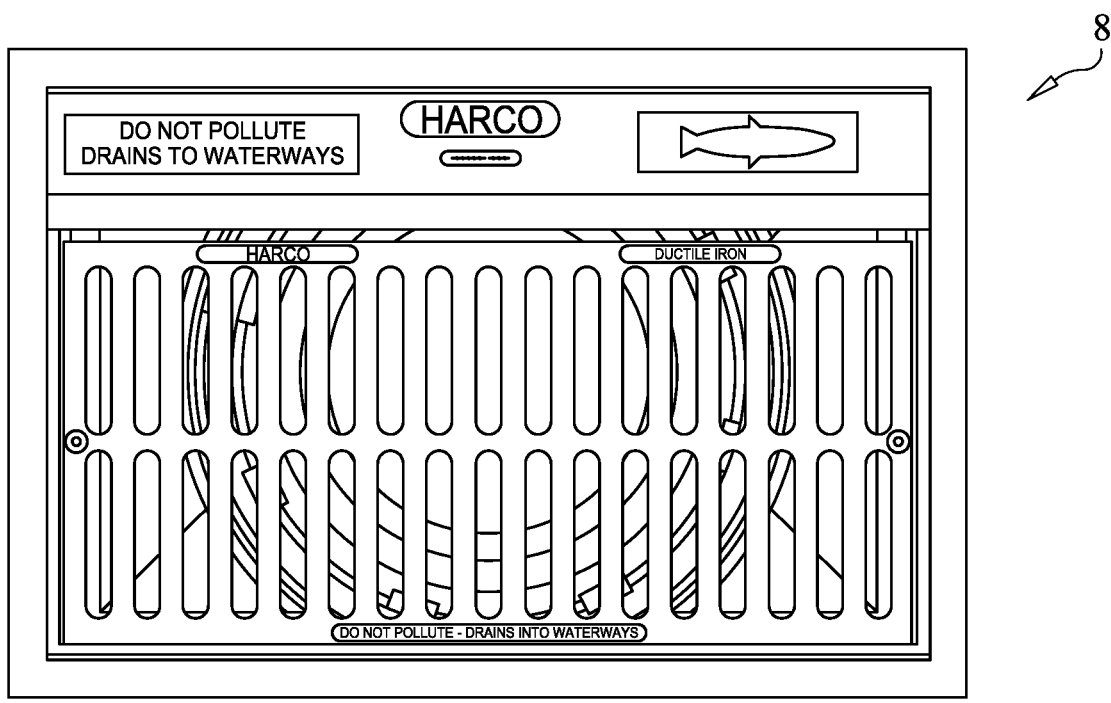
Figure 5:
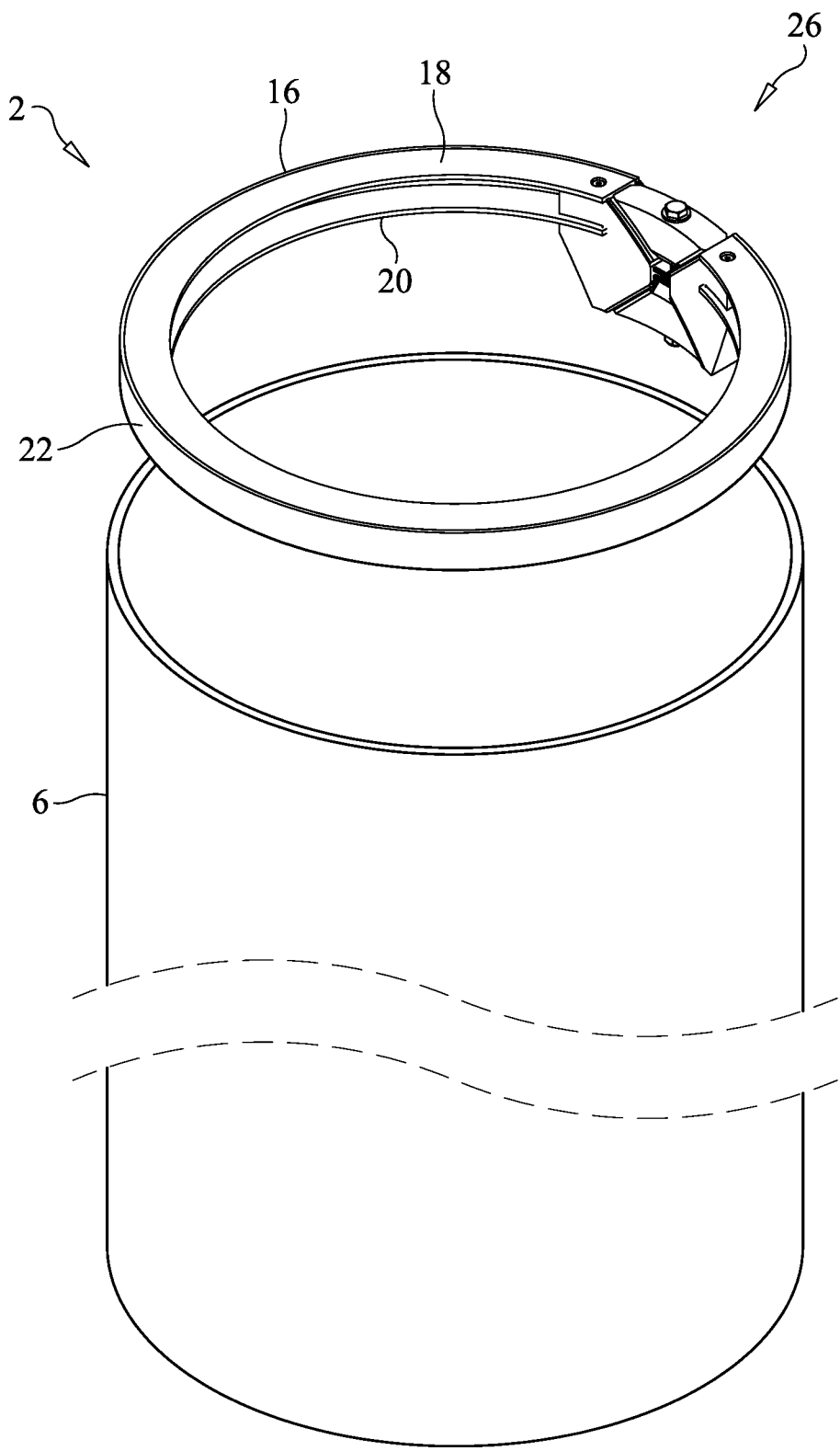
FIG. 5 is a perspective view of an expansion support ring constructed in accordance with a first form of the present invention, shown situated above and receivable by a vertically disposed pipe or conduit of a storm water drainage system.
Figures 6, 7:
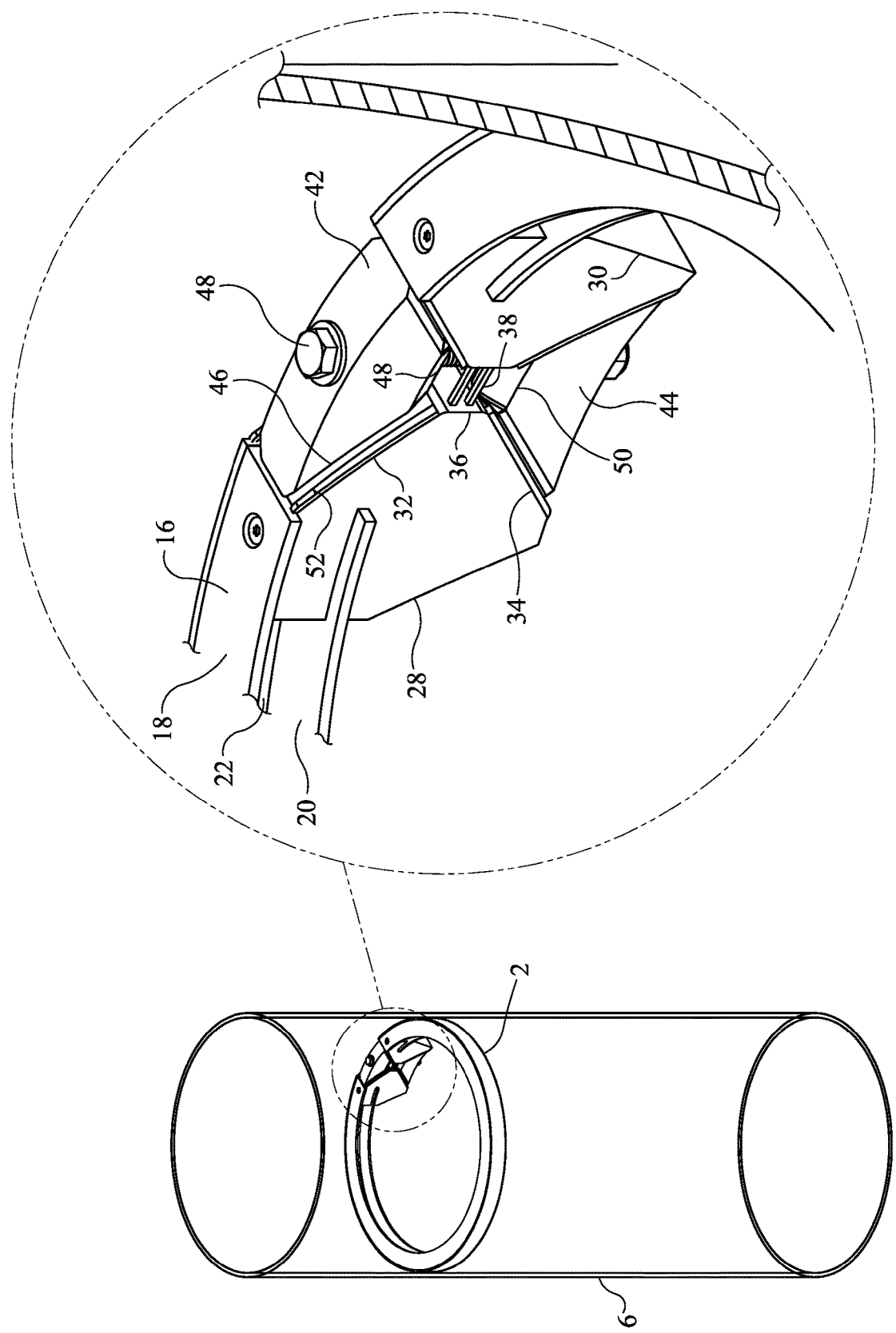
FIG. 6 is a perspective view of the expansion support ring of the present invention shown in FIG. 5, and illustrating the expansion support ring being mounted in the vertical pipe or conduit of a storm water drainage system.
FIG. 7 is a detailed perspective view of a portion of the expansion support ring of the present invention shown encircled in FIG. 6 of the drawings.
Figure 8:
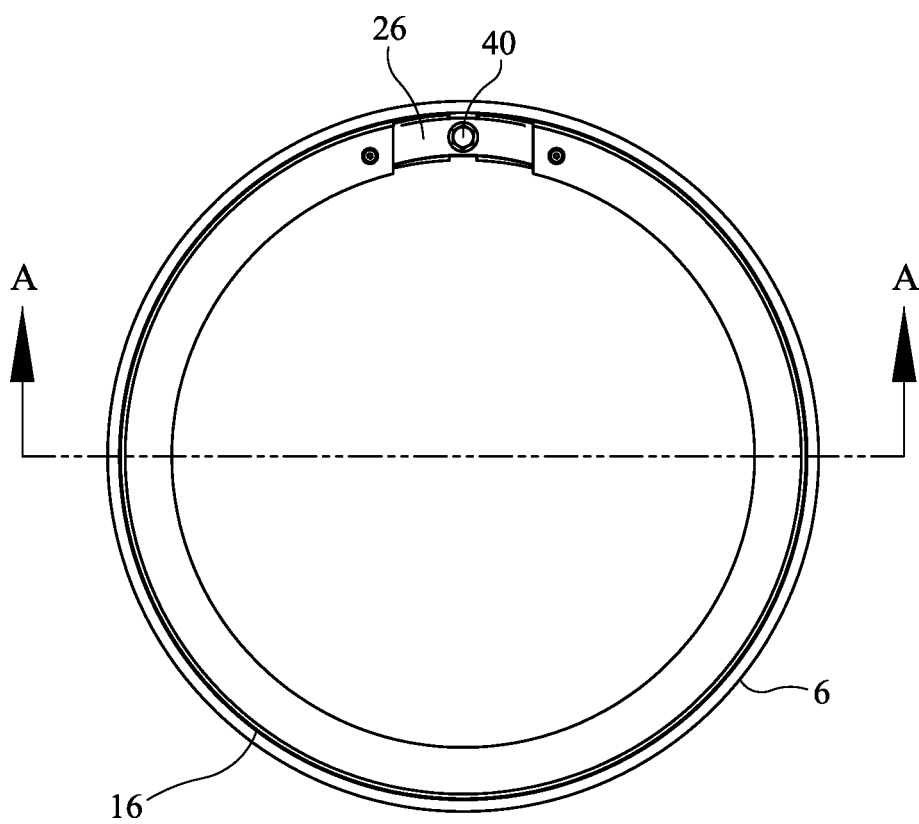
FIG. 8 is a top plan view of the expansion support ring of the present invention shown in FIGS. 5-7, and illustrating the expansion support ring being mounted within a vertical pipe or conduit of a storm water drainage system.

Reference should be had initially to FIGS. 1, 1A, 1B, 2A, 2B, 3A, 3B, 4A-4D, 5, 6, 7, 8 and 9 of the drawings, where it will be seen that an expansion support ring 2, for mounting thereon a debris or contaminant filtering apparatus 4, may be secured within the bore of a conduit or pipe 6 of a runoff water drainage system at a desired location therein. In this way, the filtering apparatus 4 will not interfere with or raise the grate 8 or manhole cover, such as shown in FIGS. 4A-4D, at the entry of a conduit 6 forming part of a runoff water drainage system. The filtering apparatus 4 shown in the drawings herein is of the sock-type, including a flexible, water permeable filter medium 10 having a closed bottom end and an open top end which is mounted to a mounting flange 12 and support ring 14, all forming part of the filtering apparatus 4. However, it should be understood that other filtering apparatus 4, such as the runoff water filter and shut off apparatus disclosed in the aforementioned U.S. Patent Application Publication No. 2017/0321412, may be supported within a conduit or pipe 6 at a desired location therewithin by the expansion ring 2 of the present invention. Furthermore, it should be understood that the expansion ring 2 of the present invention may be used not only in vertically disposed conduits but also in horizontally disposed conduits and pipes to support other filtering apparatus 4, such as a debris screen, therein.

As can be seen from the drawings and in particular the aforementioned figures, the mounting flange 12 of the filtering apparatus 4 rests on or is attached to the upper portion of the expansion support ring 2 of the present invention. Furthermore, the expansion support ring 2 allows for the easy removal of the filtering apparatus 4 from the conduit 6 in which it is placed for cleaning or replacement. Additionally, the expansion support ring 2 of the present invention may be easily removed from the conduit 6 or repositioned therein, without the need for elaborate tools or torque wrenches.

Figure 11:
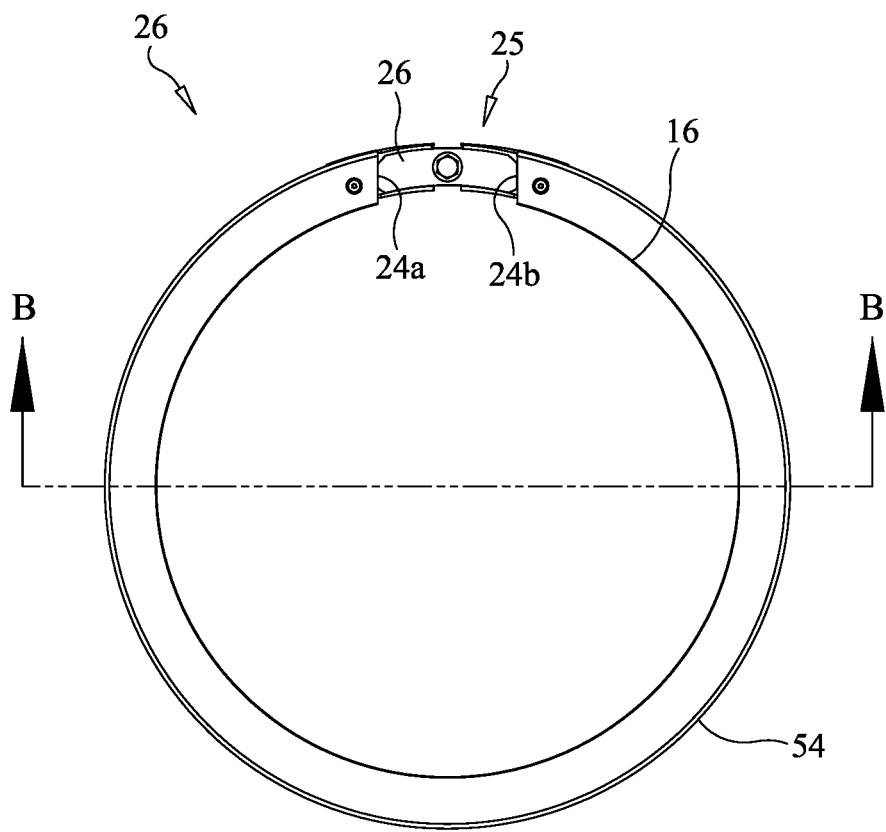
FIG. 11 is a top plan view of the expansion support ring of the present invention shown in FIGS. 5-10.
Figure 12A:
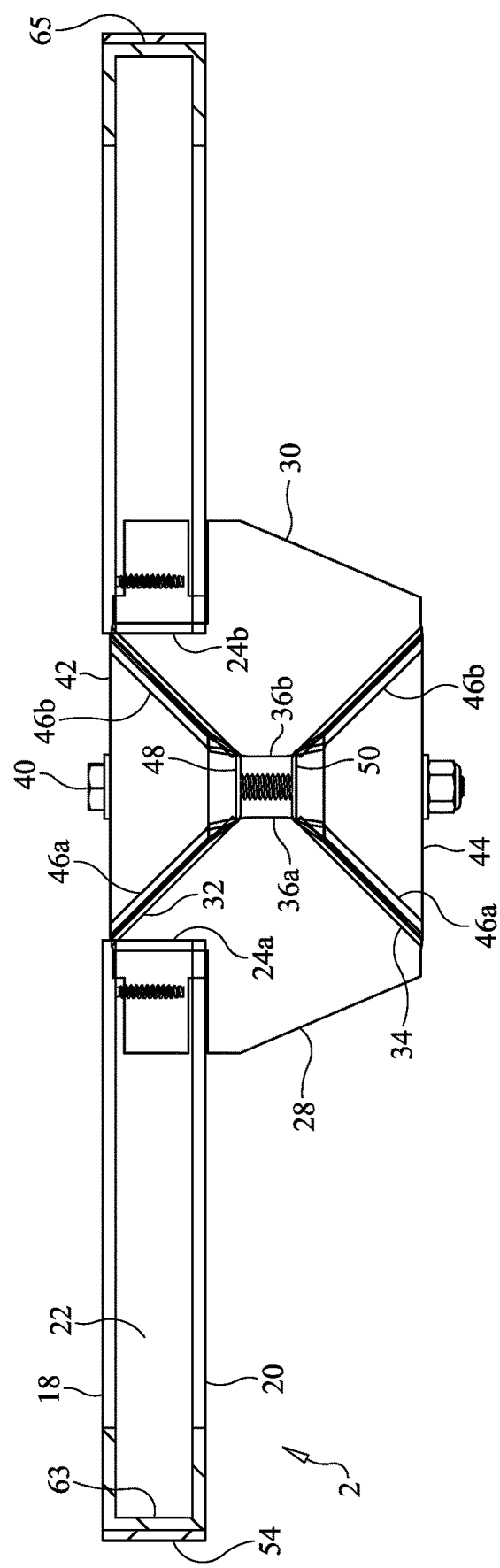
FIG. 12A is a cross-sectional view of the expansion support ring of the present invention shown in FIG. 11, taken along line B-B of FIG. 11.
Figure 12B:
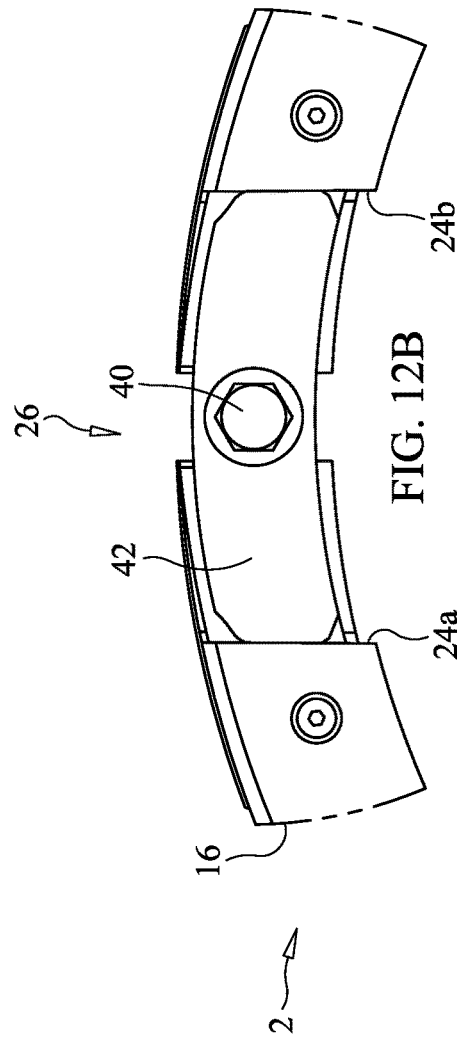
FIG. 12B is a top plan view of a portion of the expansion support ring of the present invention shown encircled by broken lines in FIG. 11 of the drawings.

One form of an expansion support ring 2 of the present invention is shown in FIGS. 5-12B of the drawings. The expansion support ring 2 basically includes a circular expansion member 16 formed as an extruded section of plastic or metal, preferably aluminum, which is U-shaped in transverse cross-section to define the expansion member 16 with spaced apart, radially inwardly extending, parallel upper and lower walls 18, 20 and a radially outer wall 22 joined to the upper and lower walls 18, 20. The expansion member 16 is cut to define two circumferential open end portions 24 thereof that face each other and are separated from each other by a predetermined distance to define a space therebetween. Between the two open ends 24 of the expansion member 16 and in the space therebetween is situated a wedge assembly 26, which is used to increase the diameter of the expansion member 16 so that the expansion ring 2 may closely engage the inner side wall of the conduit or pipe 6 in which it is mounted and to secure the expansion ring 2 in place at a desired location therewithin. The wedge assembly 26 also allows the expansion member 16 to be decreased in diameter so that the expansion ring 2 may be initially positioned at the desired location within the conduit 6 of the water runoff drainage system, or may be easily removed therefrom.

Basically, and as shown in FIGS. 7, 10, 12A and 12B of the drawings, the wedge assembly 26, for adjusting the diameter of the expansion ring 2, includes a first expansion block 28 and a second expansion block 30 situated opposite the first expansion block 28. The first expansion block 28 is secured by a fastener, such as a machine screw, to one open end portion 24 of the expansion member 16, and the second expansion block 30 is secured, also by a fastener, such as a machine screw, to the other opposite open end portion 24 of the expansion member 16 so that the first and second expansion blocks 28, 30 extend into the space between the open end portions 24 of the expansion member 16.

Each of the first and second expansion blocks 28, 30 includes an upper sloping surface 32 and lower sloping surface 34. More specifically, the upper sloping surface 32 extends from a top portion of its respective block 28, 30 from where the block is attached to its respective open end portion 24 of the expansion member 16 downwardly and outwardly into the space between the open end portions 24 of the expansion member 16. The lower sloping surface 34 extends upwardly from a lower portion of a respective expansion block 28, 30 upwardly and outwardly into the space between the open end portions 24 of the expansion member 16. The upper and lower sloping surfaces 32, 34 of the first and second expansion blocks 28, 30 terminate at a flat surface 36, the flat surface 36 of the first expansion block 28 facing the flat surface 36 of the second expansion block 30 and defining a gap therebetween. Extending outwardly from the flat surface 36 of each of the first and second expansion blocks 28, 30 and into the gap therebetween is situated one or more breakaway connecting tabs 38. The breakaway connecting tabs 38 are aligned with and overlap one another within the gap between the flat surfaces 36 of the first and second expansion blocks 28, 30. Each breakaway connecting tab 38 may have an opening formed through the thickness thereof, which openings are aligned to receive a threaded rod 40, such as a machine bolt, that passes therethrough, as will be explained in greater detail. As will also be explained in greater detail, the upper and lower sloping surfaces 32, 34 of the first and second expansion blocks 28, 30 define sliding surfaces on which other components of the wedge assembly 26 engage.

As may also be seen from FIGS. 7, 10, 12A and 12B of the drawings, the wedge assembly 26 of the expansion ring 2 used to enlarge and reduce the overall diameter of the expansion ring 2 includes upper and lower sliding wedge members 42, 44. Each of the upper and lower sliding wedge members 42, 44 is generally triangular in shape, having sloping side walls 46 which mutually converge to and terminate at a lower wall 48 on the upper sliding wedge member 42 and an upper wall 50 on the lower sliding wedge member 44. The lower wall 48 of the upper sliding wedge member 42 and the upper wall 50 of the lower sliding wedge member 44 face each other and, when the wedge assembly 26 is not in a tightened state, are separated from each other by a predetermined distance within the gap between the first and second expansion blocks 28, 30.

Each sliding wedge member 42, 44 includes a bore formed through the thickness thereof, which bore receives the machine bolt 40 mentioned previously, such that the upper and lower sliding wedge members 42, 44 are arranged on the machine bolt 40 in mirror image, facing each other. As mentioned previously, the machine bolt 40 also passes through the breakaway connecting tabs 38 of the first and second expansion blocks 28, 30. The purpose of the breakaway connecting tabs 38 is to at least initially secure the upper and lower sliding wedge members 42, 44 to the first and second expansion blocks 28, 30, that is, to maintain the expansion blocks 28, 30 and sliding wedge members 42, 44 together during assembly and placement of the expansion ring 2, in an unexpanded state, into the drain conduit 6 at a desired location therein. Once the expansion ring 2 is properly located within the bore of the drain pipe 6 and leveled, and the wedge assembly 26 is tightened to expand the expansion ring 2, the breakaway connecting tabs 38 will disconnect from the facing flat surfaces 36 of the first and second expansion blocks 28, 30 from which they extend, as they will no longer be required since the upper and lower wedge members 42, 44 will be held in place by their engagement with the first and second expansion blocks 28, 30.

In order to increase the diameter of the expansion member 16 and to expand the expansion ring 2, the head of the machine bolt 40 which passes through the upper and lower sliding wedge members 42, 44 may be turned in a first direction. When the machine bolt 40 is turned, the first and second wedge members 42, 44, which face each other on the bolt 40, will advance relatively towards one another. The sloping side walls 46 of the upper and lower sliding wedge members 42, 44 will engage the upper and lower sloping surfaces 32, 34 of the first and second expansion blocks 28, 30 and will force the expansion blocks to separate from one another. This, in turn, will cause the diameter of the expansion member 16 to increase and expand the expansion ring 2 so that the ring 2 tightly engages the inner surface of the conduit or pipe 6 of the runoff water drainage system in which it is mounted in order to secure the expansion ring 2 in place therewithin. Either both sliding wedge members 42, 44 may move on the threaded rod 40 when the rod 40 is turned, or one of the sliding wedge members 42, 44 is mounted on the rod 40 and remains in place thereon while the other sliding wedge member 42, 44 moves axially on the rod 40 towards and/or away from the non-moving sliding wedge member 42, 44 as the rod 40 is turned.

As mentioned previously, one of the advantages of the particular structure of the wedge assembly 26 forming part of the expansion ring 2 of the present invention is that no torque wrench is needed to expand the expansion ring 2 to a desired diameter, since usually no torque wrenches are carried by the team that installs such debris or contaminant filtering apparatus 4. This is because that, when the flat lower and upper walls 48, 50 of the upper and lower sliding wedge members 42, 44 meet and contact each other, the machine bolt 40 on which the upper and lower wedge members 42, 44 are mounted cannot be tightened substantially any further, and the expansion ring 2 assumes a predetermined diameter selected based on the inner diameter of the pipe or conduit 6 in which the expansion ring 2 is designed to be mounted.

When the machine bolt 40 is turned in the opposite direction, the facing upper and lower sliding wedge members 42, 44 separate from one another on the bolt such that the expansion member 16 may return to and assume a smaller diameter, so that the pressure exerted by the expansion member 16 on the inner surface of the pipe or conduit 6 is relaxed. This allows the expansion ring 2 to be either removed from or repositioned within the bore of the drain conduit 6.

The upper and lower sliding wedge members 42, 44 may be colored a different color than that of the first and second expansion blocks 28, 30 so that the wedge members 42, 44 are more visible in contrast to the expansion blocks 28, 30 and the installation team may determine whether the sliding wedge members 42, 44 need to be advanced farther on the machine bolt 40 to properly secure the expansion ring 2 to the conduit 6. Alternatively, the sloping surfaces 32, 34 of the first and second expansion blocks 28, 30 may include indicia, such as a line 52, running transversely across the upper (or lower) sloping surfaces thereof. When the top surface of the upper wedge member 42 (or bottom surface of the lower wedge member 44) is in alignment with the indicia, such indicates that the wedge assembly 26 need not be tightened any further, as proper adjustment has been made to secure the expansion ring 2 to the inner surface of the conduit 6 in which it is mounted. Alternatively, indicia, such as lines 53, 55, may be respectively provided on a visible surface of one or both of the expansion blocks 28, 30 and one or both of the sliding wedge members 42, 44. When the lines 53, 55 come into alignment as the threaded rod 40 is turned, such line alignment indicates that the expansion ring 2 is properly torqued to hold and support the filtering apparatus 4 in place within the conduit 6 of a storm water drainage system.

The outer wall 22 extending between the spaced apart upper wall 18 and the lower wall 20 of the transversely U-shaped expansion member 16 may include a plurality of holes (not shown) formed through the thickness thereof and periodically spaced about the circumference of the expansion member 16. The holes will accept machine screws (not shown) which may be used to engage the inner surface of the pipe 6 in which the expansion ring 2 is mounted to further ensure that the expansion ring 2 will not slip in the pipe 6 from its location therein, supplementing the pressure exerted by the expansion ring 2 on the inner surface of the conduit 6 by tightening the wedge assembly 26. In addition, the radially outer surface of the outer wall 22 of the expansion member 16 may include an abrasive gasket 54 formed thereon or attached thereto to further prevent slippage of the expansion ring 2 with respect to the inner surface of the conduit 6 in which it is mounted.

Figure 13:
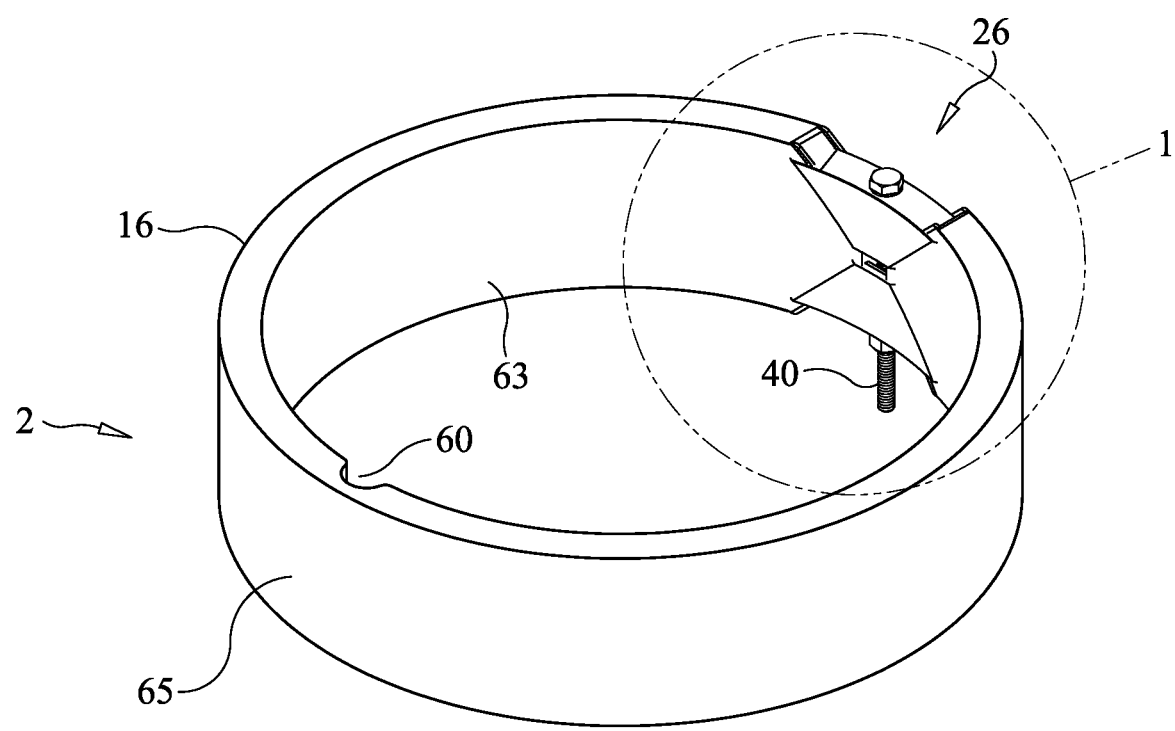
FIG. 13 is a perspective view of an expansion support ring formed in accordance with a second form of the present invention.
Figure 14:
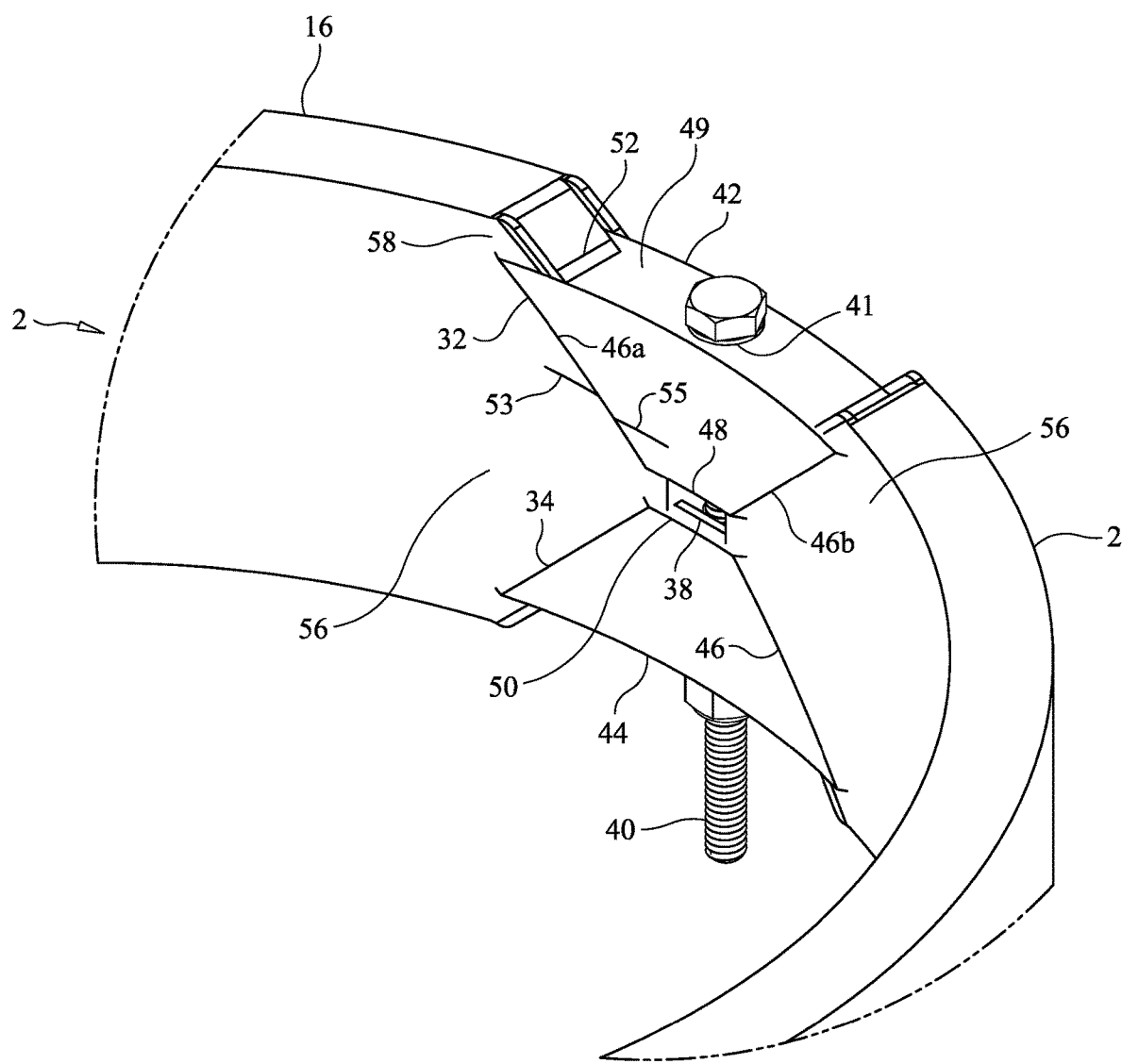
FIG. 14 is a detailed perspective view of a portion of the expansion support ring shown encircled with broken lines in FIG. 13 of the drawings.
Figure 15:
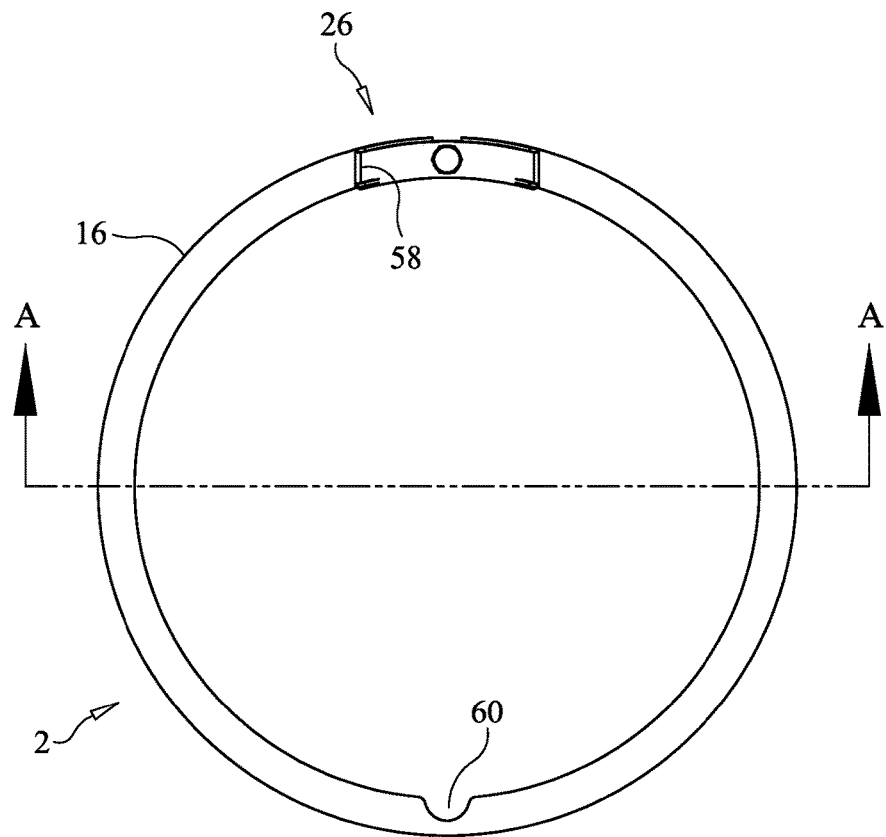
FIG. 15 is a top plan view of the expansion support ring of the present invention shown in FIGS. 13 and 14.
Figure 16:
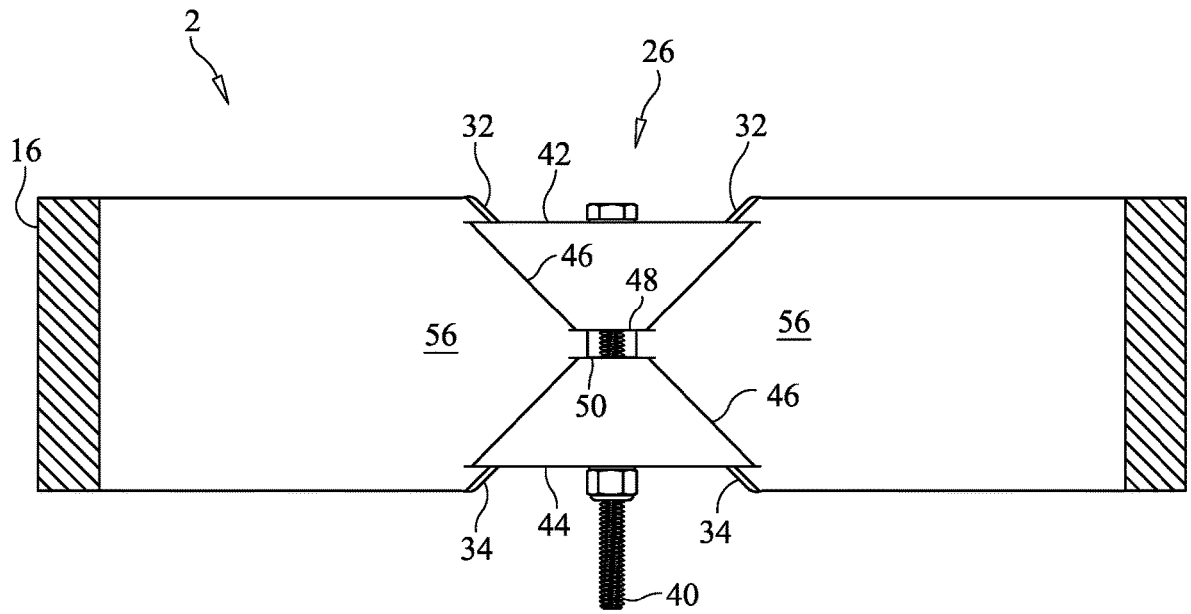
FIG. 16 is a cross-sectional view of the expansion support ring of the present invention shown in FIG. 15, taken along line A-A of FIG. 15.

A second form of an expansion ring 2 constructed in accordance with the present invention is shown in FIGS. 13-16 of the drawings. Here, the expansion ring 2 is formed with a cylindrical, molded member 16 preferably of a plastic material. The expansion ring 2 is split transversely to define two circumferentially disposed end portions 56 that face one another with a gap formed therebetween. With this embodiment of the expansion ring 2 of the present invention, the end portions 56 of the cylindrical expansion member 16 are shaped to define integrally the first and second expansion blocks 28, 30 described previously in relation to the first embodiment of the expansion ring 2. More specifically, each of the facing end portions 56 of the cylindrical member 16 is formed with upper and lower sloping surfaces 32, 34, the surfaces 32, 34 being angled inwardly and mutually converging towards the gap to a flat surface 36 between the facing end portions 56. Within this gap is situated the upper and lower sliding wedge members 42, 44, also mounted on a machine bolt 40, such as described previously. Thus, the upper and lower sliding wedge members 42, 44 engage and slide on the upper and lower sloping surfaces 32, 34 of the facing end portions 56 of the cylindrical expansion member 16. Proper torquing of the upper and lower wedge members 42, 44 and the machine bolt 40 on which the wedge members 42, 44 are mounted is achieved when the facing flat lower and upper walls 48, 50 of the wedge members 42, 44 engage one another. When this occurs, the expansion ring 2 has expanded to a predetermined diameter such that the expansion ring 2 tightly contacts the inner surface of the conduit 6 in which it is mounted to hold the expansion ring 2 in place at a desired location within the bore of the drain conduit 6.

With the embodiment shown in FIGS. 13-16 of the drawings, the sloping side walls 46 of each of the upper and lower wedge members 42, 44 may be formed with a recessed channel 58 running the length of the sloping side walls 46. The width of the channels 58 formed in the sloping side walls 46 of the upper and lower wedge members 42, 44 is dimensioned so that the channels 58 may respectively receive therein the upper and lower sloping surfaces 32, 34 of the end portions 56 of the cylindrical expansion member 16. The channels 58 are provided to help guide and retain the end portions 56 of the expansion member 16 within the channels 58 and against the sloping side walls 46 of the upper and lower wedge members 42, 44.

Rotating the head of the machine bolt 40 on which the upper and lower wedge members 42, 44 are mounted in one direction tightens the wedge assembly 26 by causing the upper and lower wedge members 42, 44 to advance towards one another. As with the previous embodiment of the expansion ring 2, such action causes the end portions 56 of the expansion member 16 to separate which, in turn, causes the expansion ring 2 to increase in diameter and exert pressure on the inner surface of the drain conduit 6 in which the expansion ring 2 is mounted. Turning the head of the machine bolt 40 in the opposite direction will cause the upper and lower wedge members 42, 44 to separate from each other, thereby allowing the expansion member 16, and ring 2, to decrease in diameter so that the expansion ring 2 may be easily inserted in the bore of the drain conduit 6 and positioned therein in a desired location, or removed from the conduit 6. As with the other embodiment described previously, the expansion ring 2 of the present invention shown in FIGS. 13-16 may include a sandpaper-like abrasive gasket 54 formed on or attached to the outer surface of the expansion member 16 to help secure the expansion ring 2 to the inner surface of the drain conduit 6 in which it is mounted. Also, the expansion member 16 may include a plurality of spaced apart holes (not shown) formed through the thickness thereof, the holes receiving screws (not shown) which may be used to engage the drain conduit 6 to help secure the expansion ring 2 within the conduit 6.

As with the previous embodiment of the expansion ring 2 described herein, breakaway connecting tabs 38 may extend outwardly from the facing flat surface 36 of each end portion 56 of the expansion member 16 into the gap formed therebetween. The breakaway connecting tabs 38 overlap one another and include an opening formed through the thickness thereof which receives the machine bolt 40 on which the upper and lower wedge members 42, 44 are mounted.

Again, the purpose of the breakaway connecting tabs 38 is to secure the upper and lower wedge members 42, 44 to the expansion member 16 at least until the expansion ring 2 is properly positioned within the bore of the drain conduit 6. Then, the machine bolt 40 is turned to advance the upper and lower sliding wedge members 42, 44 together, which forces the facing end portions 56 of the expansion member 16 apart, thereby breaking the breakaway connecting tabs 38 used to hold the upper and lower wedge members 42, 44 and expansion member 16 together, as such tabs 38 are no longer needed.

Furthermore, the expansion member 16 of the ring 2 may include a notch or cutout 60 running transversely across the radially inner surface thereof and situated diametrically opposite to where the upper and lower sliding wedge members 42, 44 are located. This notch or cutout 60 reduces the overall thickness of the expansion member 16 where the notch or cutout 60 is located to help allow the expansion member 16 to increase in diameter when the machine bolt 40 is tightened. The provision of the transverse cutout 60 adds to the resiliency of the expansion ring 2 to allow the expansion ring 2 to be more easily tightened against the inner surface of the drain conduit 6 in which it is mounted.

To facilitate a full understanding of the present invention, the expansion ring and filtering apparatus supported thereby disclosed previously will now be further described.

In one form of the present invention, an expansion ring 2 mountable in a storm drain for supporting a filtering apparatus 4, the storm drain including a tubular portion 6 having an inner side wall, includes a ring-shaped expansion member 16 and a wedge assembly 26. The ring-shaped expansion member 16 has an adjustable diameter and is cut transversely to define a first open end portion 24a and a second open end portion 24b. The first and second open end portions 24a, 24b face each other and are separated from each other by a predetermined distance to define a gap 25 therebetween.

The wedge assembly 26 is positioned at the gap 25 between the first and second open end portions 24a, 24b of the expansion member 16. The wedge assembly 26 is adjustable to increase the diameter of the expansion member 16.

When the expansion ring 2 is mounted in the tubular portion 6 of the storm drain and the wedge assembly 26 is adjusted to increase the diameter of the ring-shaped expansion member 16, the ring-shaped expansion member 16 tightly engages the inner side wall of the tubular portion 6 of the storm drain to secure the expansion ring 2 in a desired position within the tubular portion 6 of the storm drain.

The ring-shaped expansion member 16 may be formed as an extruded section of one of plastic and metal. In one form of the ring-shaped expansion member 16, at least a portion of the expansion member 16 includes spaced apart, radially inwardly extending, parallel upper and lower walls 18, 20 and a radially outer wall 22 joined to the upper and lower walls 18, 20.

Preferably, the wedge assembly 26 includes a first expansion block 28 and a second expansion block 30 situated opposite the first expansion block 28. The first and second expansion blocks 28, 30 are respectively disposed at the first and second open end portions 24a, 24b of the expansion member 16.

Also, the wedge assembly 26 includes upper and lower sliding wedge members 42, 44. The upper and lower sliding wedge members 42, 44 are engagable with the first and second expansion blocks 28, 30 to exert a force thereon in mutually opposite directions. The upper and lower sliding wedge members 42, 44 are spaced apart from each other by an adjustable distance, the distance being adjustable between at least a first distance and a second distance, the second distance being less than the at least first distance. Adjustment of the distance between the upper and lower sliding wedge members 42, 44 from the at least first distance to the second distance causes the upper and lower sliding wedge members 42, 44 to exert the force on the first and second expansion blocks 28, 30 in the mutually opposite directions, thereby causing the diameter of the expansion member 16 to increase from the diameter of the expansion member 16 when the distance that the upper and lower sliding wedge members 42, 44 are spaced apart is the first distance.

In yet another form of the expansion ring 2, the wedge assembly 26 includes a first expansion block 28 and a second expansion block 30 situated opposite the first expansion block 28, the first and second expansion blocks 28, 30 being respectively disposed at the first and second open end portions 24*a*, 24*b* of the expansion member 16; and upper and lower sliding wedge members 42, 44, the upper and lower sliding wedge members 42, 44 being engagable with the first and second expansion blocks 28, 30 to exert a force thereon in mutually opposite directions, the upper and lower sliding wedge members 42, 44 being spaced apart from each other by an adjustable distance. Adjustment of the distance between the upper and lower sliding wedge members 42, 44 causes the upper and lower sliding wedge members 42, 44 to exert the force on the first and second expansion blocks 28, 30 in mutually opposite directions, the force exerted on the first and second expansion blocks 28, 30 causing the first and second expansion blocks 28, 30 to separate from each other thereby causing the ring-shaped expansion member 16 to increase in diameter.

Preferably, each of the first and second expansion blocks 28, 30 includes an upper sloping surface 32 and a lower sloping surface 34. Furthermore, each of the upper and lower sliding wedge members 42, 44 is preferably generally triangular in shape and includes a first sloping side wall 46*a* and a second sloping side wall 46*b*. The first and second sloping side walls 46*a*, 46*b* of the upper sliding wedge member 42 respectively engages the upper sloping surfaces 32 of the first and second expansion blocks 28, 30, and the first and second sloping side walls 46*a*, 46*b* of the lower sliding wedge member 44 respectively engages the lower sloping surfaces 34 of the first and second expansion blocks 28, 30.

In another form of the expansion ring 2 of present invention, the wedge assembly 26 further includes a threaded rod 40. Each of the upper and lower sliding wedge members 42, 44 has a bore 41, and the threaded rod 40 is rotatably received by the bores 41 of the upper and lower sliding wedge members 42, 44 such that the upper and lower sliding wedge members 42, 44 are mounted on the threaded rod 40. Rotation of the threaded rod 40 causes at least one of the upper and lower sliding wedge members 42, 44 to move on the threaded rod 40 in a direction at least one of towards the other of the upper and lower sliding wedge members 42, 44 and away from the other of the upper and lower sliding wedge members 42, 44.

In another preferred form of the expansion ring 2, the wedge assembly 26 further includes at least one connecting tab 38. The at least one connecting tab 38 includes an opening formed through the thickness thereof through which the threaded rod 40 passes. The at least one connecting tab 38 holds the upper sliding wedge member 42 and the lower sliding wedge member 44 to the first expansion block 28 and the second expansion block 30.

In yet another form of the expansion ring 2 of the present invention, the upper sliding wedge member 42 includes a lower wall 48 joined to the first sloping side wall 46*a* and the second sloping side wall 46*b* of the upper sliding wedge member 42, and the lower sliding wedge member 44 includes an upper wall 50 joined to the first sloping side wall 46*a* and the second sloping side wall 46*b* of the lower sliding wedge member 44. The upper sliding wedge member 42 and the lower sliding wedge member 44 are situated relative to one another such that the lower wall 48 of the upper sliding wedge member 42 faces the upper wall 50 of the lower sliding wedge member 44.

Preferably, the threaded rod 40 is rotatable in at least one direction which causes relative movement between the first sliding wedge member 42 and the second sliding wedge member 44 towards each other to a degree that the lower wall 48 of the upper sliding wedge member 42 contacts the upper wall 50 of the lower sliding wedge member 44.

In yet another preferred form of the expansion ring 2 of the present invention, at least one of the upper sloping surface 32 of the first expansion block 28 and the upper sloping surface 32 of the second expansion block 30 includes indicia, such as a line 52, situated thereon. Furthermore, the upper sliding wedge member 42 includes a top wall 49 situated opposite the lower wall 48. When the threaded rod 40 is rotated and causes relative movement between the upper sliding wedge member 42 and the lower sliding wedge member 44 such that the upper sliding wedge member 42 is in a desired position relative to the first expansion block 28 and the second expansion block 30, the top wall 49 of the upper sliding wedge member 42 will be in alignment with the indicia 52 formed on the at least one of the upper sloping surface 32 of the first expansion block 28 and the upper sloping surface 32 of the second expansion block 30.

In yet a further form of the expansion ring 2 of the present invention, at least one of the first expansion block 28 and the second expansion block 30 includes indicia, such as a line 52, situated thereon, and the upper sliding wedge member 42 includes a top wall 49 situated opposite the lower wall 48 of the upper sliding wedge member 42, and the lower sliding wedge member 44 includes a bottom wall 57 situated opposite the upper wall 50 of the lower sliding wedge member 44. When the threaded rod 40 is rotated and causes relative movement between the first sliding wedge member 42 and the second sliding wedge member 44 such that at least one of the upper sliding wedge member 42 and the lower sliding wedge member 44 is in a desired position relative to the first expansion block 28 and the second expansion block 30, one of the top wall 49 of the first sliding wedge member 42 and the bottom wall 57 of the lower sliding wedge member 44 will be in alignment with the indicia 50 formed on the at least one of the first expansion block 28 and the second expansion block 30.

In still another form of the expansion ring 2 of the present invention, each of the first expansion block 28 and the second expansion block 30 is generally triangular in overall shape. Furthermore, each of the first expansion block 28 and the second expansion block 30 includes a flat face 36*a*, 36*b*. The flat face 36*a* of the first expansion block 28 is joined to the upper sloping surface 32 and the lower sloping surface 24 of the first expansion block 28. The flat face 36*b* of the second expansion block 30 is joined to the upper sloping surface 32 and the lower sloping surface 34 of the second expansion block 30. The first expansion block 28 and the second expansion block 30 are disposed relative to each other such that the flat face 36a of the first expansion block 28 faces the flat face 36b of the second expansion block 30.

In another embodiment of the expansion ring 2 constructed in accordance with the present invention, the first expansion block 28 is integrally formed with the first open end portion 24a of the ring-shaped expansion member 16, and the second expansion block 30 is integrally formed with the second open end portion 24b of the ring-shaped expansion member 16.

Furthermore, the ring-shaped expansion member 16 of the expansion ring 2 includes a radial thickness. Additionally, the ring-shaped expansion member 16 has formed therein a cutout 60 which reduces the overall thickness of the ring-shaped expansion member 16 where the cutout 60 is located to help allow the ring-shaped expansion member 16 to increase in diameter. The cutout 60 formed in the ring-shaped expansion member 16 is preferably situated diametrically opposite to where the wedge assembly 26 is located.

In yet another preferred form of the expansion ring 2 of the present invention, the expansion member 16 includes an inner radial surface 63 and an outer radial surface 65, and the expansion ring 2 includes an abrasive gasket 54, the abrasive gasket 54 being situated on the outer radial surface 65 of the expansion member 16.

The present invention is also directed to the combination of a filtering apparatus 4 and an expansion ring 2 that is mountable in a storm drain for supporting the filtering apparatus 4, the storm drain including a tubular portion 6 having an inner side wall. Preferably, the expansion ring 2 includes a ring-shaped expansion member 16, the ring-shaped expansion member 16 having an adjustable diameter, the ring-shaped expansion member 16 being cut transversely to define a first open end portion 24a and a second open end portion 24b, the first and second open end portions 24a, 24b facing each other and being separated from each other by a predetermined distance to define a gap 25 therebetween; and a wedge assembly 26, the wedge assembly 26 being positioned at the gap 25 between the first and second open end portions 24a, 24b of the expansion member 16, the wedge assembly 26 being adjustable to increase the diameter of the expansion member 16. When the expansion ring 2 is mounted in the tubular portion 6 of the storm drain and the wedge assembly 26 is adjusted to increase the diameter of the ring-shaped expansion member 16, the ring-shaped expansion member 16 tightly engages the inner side wall of the tubular portion 6 of the storm drain to secure the expansion ring 2 in a desired position within the tubular portion 6 of the storm drain.

The filtering apparatus 4 supported by the expansion ring 2 includes a flexible, water permeable filter medium 10 having a closed bottom end 67 and an open top end 69; a mounting flange 12 disposed on the expansion ring 2; and a support ring 14, the support ring 14 securing the filter medium 10 to the mounting flange 12.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An expansion ring mountable in a storm drain for supporting a filtering apparatus, the storm drain including a tubular portion having an inner side wall, the expansion ring comprising:

a ring-shaped expansion member, the ring-shaped expansion member having an adjustable diameter, the ring-shaped expansion member being cut transversely to define a first open end portion and a second open end portion, the first and second open end portions facing each other and being separated from each other by a predetermined distance to define a gap therebetween; and a wedge assembly, the wedge assembly being positioned at the gap between the first and second open end portions of the expansion member, the wedge assembly being adjustable to increase the diameter of the expansion member;

wherein, when the expansion ring is mounted in the tubular portion of the storm drain and the wedge assembly is adjusted to increase the diameter of the ring-shaped expansion member, the ring-shaped expansion member tightly engages the inner side wall of the tubular portion of the storm drain to secure the expansion ring in a desired position within the tubular portion of the storm drain.

2. An expansion ring as defined by claim 1, wherein the ring-shaped expansion member is formed as an extruded section of one of plastic and metal.

3. An expansion ring as defined by claim 2, wherein at least a portion of the ring-shaped expansion member includes spaced apart, radially inwardly extending, parallel upper and lower walls and a radially outer wall joined to the upper and lower walls.

4. An expansion ring as defined by claim 1, wherein the wedge assembly includes:

a first expansion block and a second expansion block situated opposite the first expansion block, the first and second expansion blocks being respectively disposed at the first and second open end portions of the expansion member; and upper and lower sliding wedge members, the upper and lower sliding wedge members being engagable with the first and second expansion blocks to exert a force thereon in mutually opposite directions, the upper and lower sliding wedge members being spaced apart from each other by an adjustable distance, the distance being adjustable between at least a first distance and a second distance, the second distance being less than the at least first distance;

wherein adjustment of the distance between the upper and lower sliding wedge members from the at least first distance to the second distance causes the upper and lower sliding wedge members to exert the force on the first and second expansion blocks in the mutually opposite directions, thereby causing the diameter of the expansion member to increase from the diameter of the expansion member when the distance that the upper and lower sliding wedge members are spaced apart is the first distance.

5. An expansion ring as defined by claim 1, wherein the wedge assembly includes:

a first expansion block and a second expansion block situated opposite the first expansion block, the first and second expansion blocks being respectively disposed at the first and second open end portions of the expansion member; and upper and lower sliding wedge members, the upper and lower sliding wedge members being engagable with the first and second expansion blocks to exert a force thereon in mutually opposite directions, the upper and lower sliding wedge members being spaced apart from each other by an adjustable distance;
wherein adjustment of the distance between the upper and lower sliding wedge members causes the upper and lower sliding wedge members to exert the force on the first and second expansion blocks in mutually opposite directions, the force exerted on the first and second expansion blocks causing the first and second expansion blocks to separate from each other thereby causing the ring-shaped expansion member to increase in diameter.

6. An expansion ring as defined by claim 5, wherein each of the first and second expansion blocks includes an upper sloping surface and a lower sloping surface; and
wherein each of the upper and lower sliding wedge members is generally triangular in shape and includes a first sloping side wall and a second sloping side wall, the first and second sloping side walls of the upper sliding wedge member respectively engaging the upper sloping surfaces of the first and second expansion blocks, and the first and second sloping side walls of the lower sliding wedge member respectively engaging the lower sloping surfaces of the first and second expansion blocks.

7. An expansion ring as defined by claim 6, wherein the wedge assembly further includes a threaded rod, each of the upper and lower sliding wedge members having a bore, the threaded rod being rotatably received by the bores of the upper and lower sliding wedge members such that the upper and lower sliding wedge members are mounted on the threaded rod;
whereby, rotation of the threaded rod causes at least one of the upper and lower sliding wedge members to move on the threaded rod in a direction at least one of towards the other of the upper and lower sliding wedge members and away from the other of the upper and lower sliding wedge members.

8. An expansion ring as defined by claim 7, wherein the wedge assembly further includes at least one connecting tab, the at least one connecting tab including an opening formed through the thickness thereof through which the threaded rod passes, the at least one connecting tab holding the upper sliding wedge member and the lower sliding wedge member to the first expansion block and the second expansion block.

9. An expansion ring as defined by claim 7, wherein the upper sliding wedge member includes a lower wall joined to the first sloping side wall and the second sloping side wall of the upper sliding wedge member;
wherein the lower sliding wedge member includes an upper wall joined to the first sloping side wall and the second sloping side wall of the lower sliding wedge member; and
wherein the upper sliding wedge member and the lower sliding wedge member are situated relative to one another such that the lower wall of the upper sliding wedge member faces the upper wall of the lower sliding wedge member.

10. An expansion ring as defined by claim 9, wherein the threaded rod is rotatable in at least one direction which causes relative movement between the first sliding wedge member and the second sliding wedge member towards each other to a degree that the lower wall of the upper sliding wedge member contacts the upper wall of the lower sliding wedge member.

11. An expansion ring as defined by claim 9, wherein at least one of the upper sloping surface of the first expansion block and the upper sloping surface of the second expansion block includes indicia situated thereon; and
wherein the upper sliding wedge member includes a top wall situated opposite the lower wall;
whereby, when the threaded rod is rotated and causes relative movement between the upper sliding wedge member and the lower sliding wedge member such that the upper sliding wedge member is in a desired position relative to the first expansion block and the second expansion block, the top wall of the upper sliding wedge member will be in alignment with the indicia formed on the at least one of the upper sloping surface of the first expansion block and the upper sloping surface of the second expansion block.

12. An expansion ring as defined by claim 9, wherein at least one of the first expansion block and the second expansion block includes indicia situated thereon;
wherein the upper sliding wedge member includes a top wall situated opposite the lower wall of the upper sliding wedge member;
wherein the lower sliding wedge member includes a bottom wall situated opposite the upper wall of the lower sliding wedge member;
whereby, when the threaded rod is rotated and causes relative movement between the first sliding wedge member and the second sliding wedge member such that at least one of the upper sliding wedge member and the lower sliding wedge member is in a desired position relative to the first expansion block and the second expansion block, one of the top wall of the first sliding wedge member and the bottom wall of the lower sliding wedge member will be in alignment with the indicia formed on the at least one of the first expansion block and the second expansion block.

13. An expansion ring as defined by claim 6, wherein the wedge assembly further includes at least one connecting tab, the at least one connecting tab being joined to and extending between the first expansion block and the second expansion block.

14. An expansion ring as defined by claim 6, wherein each of the first expansion block and the second expansion block is generally triangular in overall shape; and
wherein each of the first expansion block and the second expansion block includes a flat face, the flat face of the first expansion block being joined to the upper sloping surface and the lower sloping surface of the first expansion block, the flat face of the second expansion block being joined to the upper sloping surface and the lower sloping surface of the second expansion block; and
wherein the first expansion block and the second expansion block are disposed relative to each other such that the flat face of the first expansion block faces the flat face of the second expansion block.

15. An expansion ring as defined by claim 5, wherein the first expansion block is integrally formed with the first open end portion of the ring-shaped expansion member, and the second expansion block is integrally formed with the second open end portion of the ring-shaped expansion member.

16. An expansion ring as defined by claim 1, wherein the ring-shaped expansion member includes a radial thickness; and
wherein the ring-shaped expansion member has formed therein a cutout which reduces the overall thickness of the ring-shaped expansion member where the cutout is located to help allow the ring-shaped expansion member to increase in diameter.

17. An expansion ring as defined by claim 16, wherein the cutout formed in the ring-shaped expansion member is situated diametrically opposite to where the wedge assembly is located.

18. An expansion ring as defined by claim 1, wherein the expansion member includes an inner radial surface and an outer radial surface; and wherein the expansion ring further comprises:

an abrasive gasket, the abrasive gasket being situated on the outer radial surface of the expansion member.

19. In combination:

a filtering apparatus; and an expansion ring mountable in a storm drain for supporting the filtering apparatus, the storm drain including a tubular portion having an inner side wall, the expansion ring comprising:

a ring-shaped expansion member, the ring-shaped expansion member having an adjustable diameter, the ring-shaped expansion member being cut transversely to define a first open end portion and a second open end portion, the first and second open end portions facing each other and being separated from each other by a predetermined distance to define a gap therebetween; and a wedge assembly, the wedge assembly being positioned at the gap between the first and second open end portions of the expansion member, the wedge assembly being adjustable to increase the diameter of the expansion member;

wherein, when the expansion ring is mounted in the tubular portion of the storm drain and the wedge assembly is adjusted to increase the diameter of the ring-shaped expansion member, the ring-shaped expansion member tightly engages the inner side wall of the tubular portion of the storm drain to secure the expansion ring in a desired position within the tubular portion of the storm drain.

20. A combination as defined by claim 19, wherein the filtering apparatus includes a flexible, water permeable filter medium having a closed bottom end and an open top end;

a mounting flange disposed on the expansion ring; and a support ring, the support ring securing the filter medium to the mounting flange.

* * * * *